Dec. 23, 1958     A. E. BISHOP     2,865,218
VARIABLE RATIO POWER STEERING GEAR
Filed May 7. 1957     4 Sheets-Sheet 1

Inventor
ARTHUR E. BISHOP

Dec. 23, 1958  A. E. BISHOP  2,865,218
VARIABLE RATIO POWER STEERING GEAR
Filed May 7, 1957  4 Sheets-Sheet 2

Inventor
ARTHUR E. BISHOP by Hill, Sherman, Meroni, Gross & Simpson Attys.

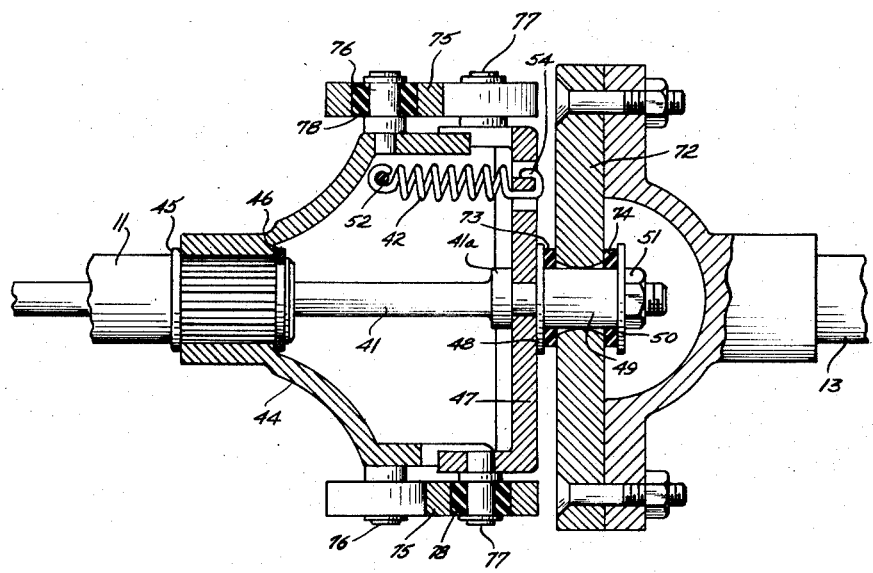

Dec. 23, 1958
A. E. BISHOP
2,865,218
VARIABLE RATIO POWER STEERING GEAR
Filed May 7. 1957
4 Sheets-Sheet 4
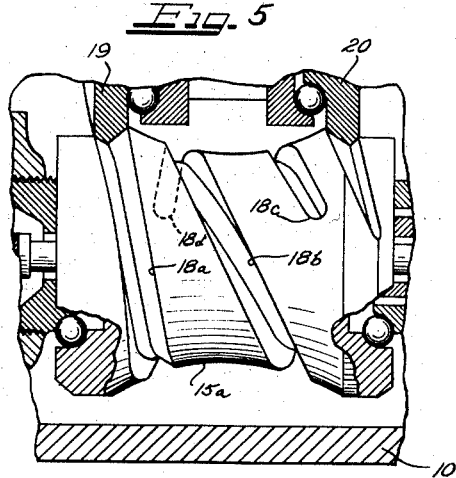
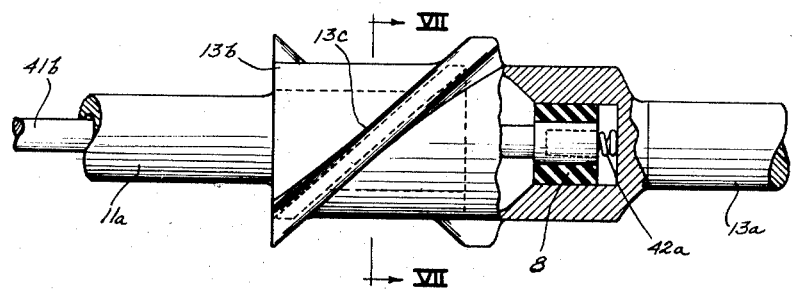
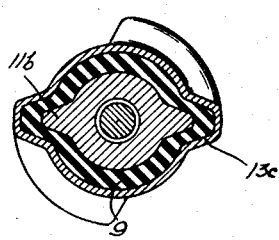
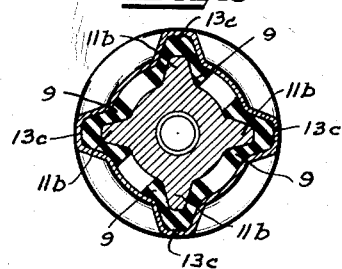
Inventor
ARTHUR E. BISHOP United States Patent Office 2,865,218
Patented Dec. 23, 1958

2,865,218

VARIABLE RATIO POWER STEERING GEAR

Arthur E. Bishop, Chatswood, near Sydney,
New South Wales, Australia

Application May 7, 1957, Serial No. 657,570

27 Claims. (Cl. 74—388)

This invention relates to steering systems for vehicles employing at least one dirgible wheel. More particularly, the invention is concerned with the provision of a novel and substantially improved power steering system for use in modern day automobiles, or the like.

I am, of course, fully aware of the fact that hydraulic, as well as other, motor means have been long employed in the steering of automotive vehicles. However, to my knowledge, none of these prior systems have completely solved the important problems of the automotive power steering field. It is, of course, extremely important to provide a simple construction capable of simple service, ready adjustment, extreme accuracy, and improved frictional characteristics, both at the steering gearing and also at the valving.

In accordance with the principles of the present invention, a very substantial improvement is provided in which the entire power steering gearing, motor, and control valve are confined within a small envelope and arranged to provide simple and complete adjustment of all of the necessary working clearances without dismantling the unit. Further, in accordance with the present invention, a universal joint connection is provided between the steering wheel shaft and the steering gear unit within the above mentioned envelope to thereby provide freedom of movement of the parts for alignment purposes. In accordance with one arrangement provided, reciprocation of the steering wheel shaft may be eliminated while at the same time actuation of the cont.ol valving of the power steering mechanism itself is accomplished through reciprocating reaction occurring at the universal joint connection.

In accomplishing the above mentioned, improved functions, the present invention incorporates a uni.ized gear box structure providing an external casing or envelope rigidly secured to the vehicle frame. A worm shaft is rotatably mounted in the casing and is secured against axial movement therein. The worm co-cpe:ates with an anti-friction worm follower direc ly secured to the cross or steering gear output shaft which in turn is likewise physically connected to the piston of a power motor. The worm is of the hour-glass type and provides a variable ratio lead novelly arranged to provide a high steering ratio in the vehicle straight-ahead condition with a sharp decrease in such ratio as the vehicle is turned away from a straight line. Power is applied to the steering gear cross shaft at a point between the cam follower and the wheels. The power motor is under the control of a reciprocably mounted spool valve arranged for movement generally longitud'nally of the axis of the worm shaft. A combined universal joint and valve actuating mechanism is provided betw:en the worm shaft and the steering mechanism shaft causing reciprocation of the valve upon relative rotation between the steering and worm shafts.

In order to provide for simple axial adjustment of the reciprocable valve, the structure of the present invention provides a pair of opposed springs of unequal spring rate. One of these springs has a very substantial spring rate while the other has a very low spring rate, the spring having the high spring rate being arranged at the end of the reciprocal valve core remote from the steering wheel in a readily accessible point on the housing. In the initial installation of tne valve, the valve is balanced between the high and low rate springs wi.h both springs arranged in a stressed condition such that movement of the valve throughout its full range may occur without completely removing the stre.s from either spring. Under this arrangement, adjustment of the axially centered position may readily be accomplished by a minor adjustment of the spring having the high spring rate. Further, a variation in the amount cf the resistance offered by the valve to valve movement may be accomplished merely by substituting a spring having a slightly different spring rate for the high rate spring. By the employment of a high rate spring combination, "feel-back" is provided successfully in the form of spring resistance and hydraulic "feel-back" often employed in prior art systems at substantial expense, is completely eliminated.

It is, accordingly, an object of the present invention to provide a simplified, extremely compact, power steering gear.

Another object of the present invention is to provide an inexpensive unitary power steering gear employing completely spring-supplied "feel-back" permitting simple adjustment of the valve centered condition.

A further object of the present invention is to provide a simple, unitary power steering construction having completely spring supplied "feel-back" capable cf simple variation to provide a changed degree of "feel-back."

Yet a further object of the present invention is to provide a power steering apparatus employing a movable power steering valve energized by relative rotation between the steering wheel shaft and the steering worm independently of slight axial misalignment therebetween.

Yet another object of the present invention is to provide an improved steering wheel shaft and steering worm universal joint connection simultaneously providing for misalignment of said shafts and reciprocation of a power steering valve.

Yet a further object of the invention is to provide an improved variable ratio steering connection between the steering wheel shaft and the cross for output shaft of a steering gear, whereby a large angular oscillation of the cross or output shaft is provided, while at the same time complete, positive, actuation of the cross shaft is assured in a safe manner.

Yet a further object of the invention is to provide an improved universal joint connection between a steering shaft and a steering gear shaft.

A feature of the invention resides in the provision of opposed balancing springs of different spring rates.

Another feature of the invention is the employment of opposed, different spring rate springs for the control of a reciprocating spool type power steering valve.

Yet a further feature of the invention is the provision of a reciprocating spool type valve arranged for positive rotation with the steering worm whereby disadvantageous frictional losses ordinarily encountered in reciprocal power steering spool valves are avoided.

Still other and further objects and features of the present invention will at once become apparent to those skilled in the art from a consideration of the attached drawings wherein a preferred embodiment of the invention is shown by way of illustration only, and wherein:

Figure 3 is a plan view, in cross-section of the universal joint connection employed in the present invention;

Figure 4 is a side elevational view of the structure shown in Figure 3, in partial cross-section;

Figure 5 is a fragmentary elevational view of a modified form of hour glass cam constructed according to the present invention;

Figure 6 is an elevational view, in partial cross-section, of a modified form of universal connection;

Figure 7 is a cross-sectional view of the joint of Figure 6 taken along the line VII—VII; and Figure 8 is a cross-sectional view of a modification of the coupling shown in Figure 7.

As shown on the drawings:

Figure 1:
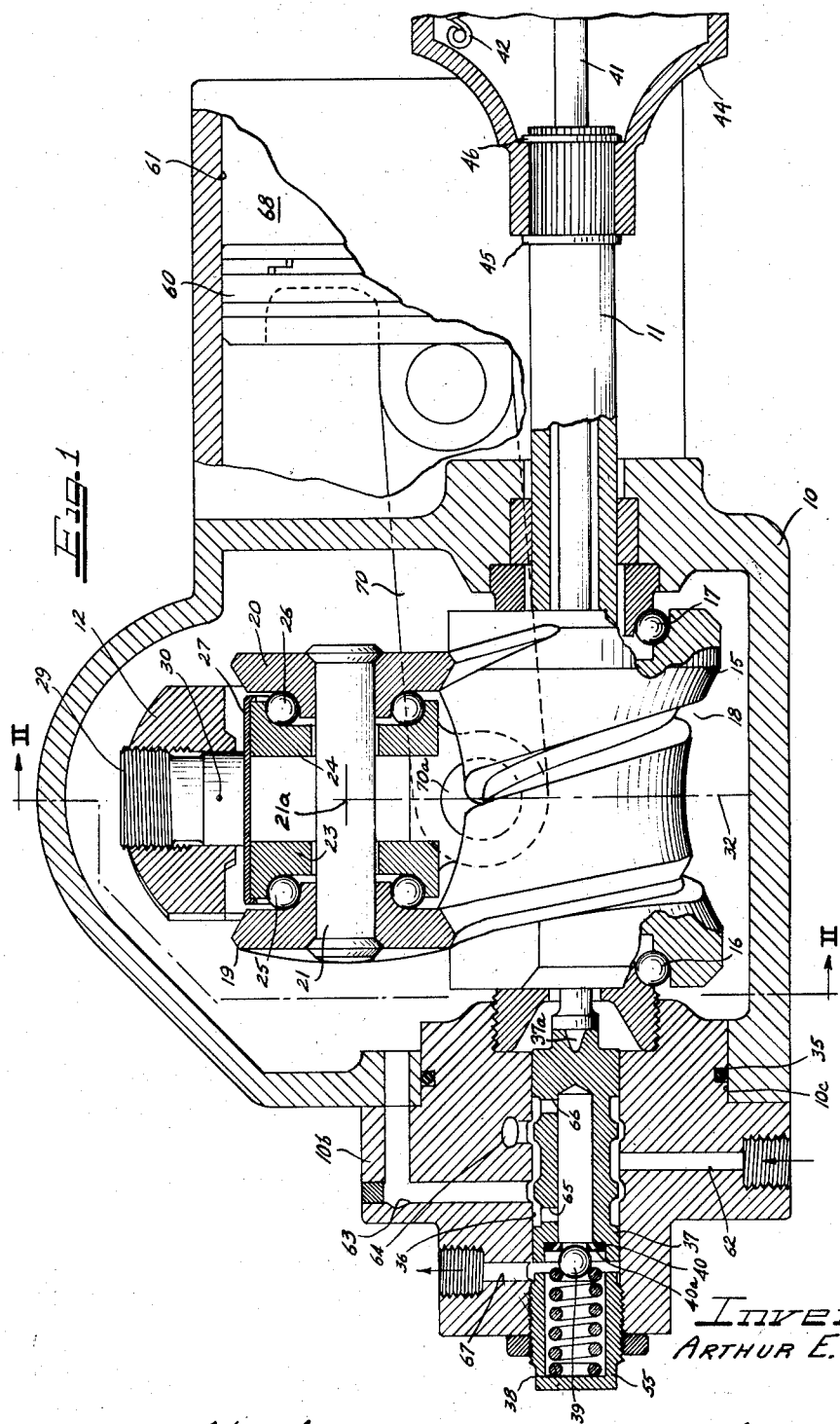
Figure 1 is a plan, sectional view of a steering gear constructed in accordance with the principles of the present invention.

As may be seen from a consideration of Figures 1 through 4, the structure of the present invention incorporates a steering gear housing or envelope 10 within which steering effort is translated from a rotational input imparted to a steering worm shaft 11 is transferred to a steering gear cross-shaft or output shaft 12. The input shaft 11 is drivingly connected to steering wheel shaft 13 through a limited angle universal joint described below and the output shaft 12 is secured to dirigible wheels of the vehicle in any conventional manner such as for example the tapered splined connection 14. In accordance with the present invention, both steering gear reduction of a variable type and power application, with the control thereof are incorporated within the housing 10.

As shown, the input shaft 11 is integrally or fixedly connected with an hour-glass worm 15, which is in turn rotatably supported in the housing 10 by means of anti-friction bearings 16 and 17. The hour-glass worm is preferably provided with a grooved cam surface 18 constructed for co-operation with a pair of laterally spaced rollers 19 and 20 mounted for anti-friction rotation relative to the cross-shaft 12. The cam followers or rollers 19, 20 are rotatable about the axis of the pin 21 and are anti-frictionally supported relative to support members 23 and 24 by roller bearings 25 and 26 respectively. The support members 23 and 24 are carried within a stamped metal C-retainer element 27, which in turn is slidably mounted in a C-guideway 28 for adjustment toward the axis of the worm 15 by means of an adjusting set screw 29. The cross shaft rotates about its longitudinal axis, indicated at 30 and may be reciprocated along its longitudinal axis to bring the mid point 21a of pin 21 into a substantially horizontal plane passing through the axis of worm 15 as viewed in Figure 2 by means of adjusting T-nut 31 threadedly secured in housing cap 10a.

As will be apparent in the embodiment of Figure 1, the cam surface or groove 18 is a single continuous groove of helical configuration with a maximum pitch at its midpoint and a rapidly decreasing pitch at its ends. As may be seen, in the vehicle straight-ahead condition, illustrated in Figures 1 and 2, the rollers 19 and 20 are both in contact with the cam groove 18 at its minimum pitch portions. Upon rotation of the worm 15 in one direction or the other, however, one or the other of the rollers 19, 20 will move completely out of the cam groove 18 while the other moves longitudinally toward the central portion of the worm 15. The position of intended normal maximum steering, either to the right or to the left is that condition in which the respective roller 19 and 20 is positioned substantially along the center-line of the worm indicated at 32. The cam groove is constructed to provide a very high steering ratio from the input shaft 11 to the output shaft 12 at the straight-ahead or in-line condition with a very rapidly decreasing ratio in the area of turn adjacent the straight-ahead position, with a gradually diminishing rate of decrease in ratio as the cross-shaft reaches its maximum angular position of turn.

Plotting steering ratio versus angle of input shaft rotation both to the left and right will provide a sharply peaked curve line substantially the same as that shown in my copending application, Serial No. 494,706, filed March 16, 1955. It will be apparent, however, that variations may be made in the cam groove 18 to provide a sharper, or more gradual curve at the peak, or in-line, condition. As a result of the arrangement shown, complete accuracy of steering is provided in the most critical, straight-ahead condition by providing contact of the worm 15 with both rollers 19 and 20. In the less critical, turning condition, in which the load of the system provides a constant biasing force on the roller 19 or 20 in one direction only, a single roller is in engagement with the cam groove. This provides an exceptionally smooth and sensitive steering construction and at the same time provides variable ratio steering which may readily be altered to provide differing degrees of ratio change by modifying the form of the cam groove 18.

At the end of the housing 10 remote from the steering wheel, an end closure cap 10b is provided. This cap closes the end opening 10c through which the hour-glass worm 15 is inserted during assembly and provides, with the O-ring seal 35, a fluid tight seal for the housing 10. The cap 10b is provided with a longitudinally extending bore 36 which is substantially coaxial with the axis of rotation of the input shaft 11. As shown in Figure 1, a reciprocable valve spool 37 is slidably mounted in the bore 36 and is biased toward the right, as viewed in Figure 1, by means of a very heavy spring having a high spring rate, such as for example on the order of 1200 lbs. per inch deflection. This spring, 38, acts against the spool valve core 37 by means of the force equalizing ball 39 and ported washer 40 to maintain the core in keyed engagement with the valve actuating rod 41 extending longitudinally through the worm shaft 11. The valve core 37 is biased toward the left by means of a weak tension spring 42 having a substantially lower spring rate than the spring 38, for example on the order of 100 lbs. per inch of deflection.

The attachment of the spring 42 to the rod 41 may more clearly be seen from a consideration of Figures 3 and 4. As there shown, a casing 44 is axially fixedly secured to shaft 11 by means of retainer clips 45 and 46. The rod 41 carries a plate 47 rigidly secured thereto by means of washer 48, spacer 49, washer 50 and nut 51 which confine the plate 47 against the rod shoulder 41a. Spring 42 is secured in the casing 44 by means of an eccentric pin 52 secured to set screw 53 and is secured in tension, as at 54, to the plate 47.

The valve core 37 is, as may be seen, unaffected by the pressure of the hydraulic fluid controlled by it. In other words, no hydraulic "feel-back" is employed in the present system for providing a biasing force tending to return the valve to its neutral condition. Instead, the entire balancing force controlling the valve of the present steering system is provided by the springs 38 and 42. Thus, if a force is applied toward the left, as viewed in Figure 1, by the actuating rod 41, the spring 38 will be compressed and at the same time the tension force at the spring 42 will be decreased. Conversely, if the rod 41 is moved toward the right, the high rate spring 38 will follow with it with a decreasing force while the tension spring 42 will be increasingly stressed. It will appear, therefore, that movement in either direction of the actuating rod 41 will provide an increasing stress in one or the other of the springs 38, 42 and a resistance to valve movement in either direction away from the neutral position will be provided.

As above described, the springs 38 and 42 are substantially different in their spring rates. In the neutral or straight-ahead position of the valve core 37, however, the two springs are balanced so that no biasing force is present tending to move the valve in either direction. With springs of differing spring rates it will be apparent that in such balanced condition the spring 38 will be deflected a substantially lesser amount than the spring 42.

However, a consideration of the spring pressures supplied by opposing, normally balanced, springs of differing spring rates will show that movement of the valve away from the central, neutral condition will be met by the same counteracting biasing force in either direction. For example, assuming that the spring 38 has a spring rate approximating 1200 lbs. per inch deflection and the spring 42 has a spring rate of approximately 100 lbs. per inch deflection and that the initial installation is adjusted to provide a neutral position of the valve core with 60 lbs. force in each spring the spring 42 would be deflected .6 inch and the spring 38 would be deflected .050 inch. If a force were applied by the rod 41 toward the left to move the valve .020 inch, the total deflection of the spring 38 would be .070 inch with a spring loading of 84 lbs. At the same time the tension in the spring 42 will be decreased by the release of the spring to .58 inch deflection resulting in a load on spring 42 of 58 lbs. The difference between 84 lbs. and 58 lbs. is the force necessary to move the valve 20/1000 of an inch to the left and equals 26 lbs. Conversely, if the valve 37 is moved .020 inch toward the right, the deflection of the spring 38 will then become .030 inch at a load of 36 lbs. At the same time the deflection of the spring 42 will increase to .62 inch with a resultant load at the spring 42 of 62 lbs. The difference between the load on springs 42 and 38, namely 62 and 36 lbs. respectively equals 26 lbs. as in the case of movement toward the left and it will accordingly be seen that although the spring rates of the springs 38 and 42 are very greatly different from each other, the effect on the system is to provide a completely balanced valve providing a very substantial resistance to valve movement even with a small amount of actual valve movement.

It will be at once apparent that the effect of the high rate spring 38 is the main factor in the amount of force required to move the valve 37. Accordingly, the midpoint position of the valve 37 may very easily be adjusted by a small adjustment of the spring 38. This may be accomplished by rotation of the spring cup 55. If the spring cup 55 is moved toward the right slightly, the valve 37 will be moved slightly toward the right a somewhat lesser amount and, conversely, if the seal 55 is moved toward the left the valve 37 will follow a slightly lesser amount. In either case, adjustment of the valve positioned by means of movement of the seat 55 will not affect the force required to move the valve from its centered condition as above calculated.

It will be apparent, further, that the amount of force required to move the valve 37 a given distance from the neutral to an operative control position may be varied by substitution of a new high rate spring of a different spring rate for the spring 38. For example, if an increase in force requirement is desired, a new high rate spring is supplied having a spring rate of a higher value. For example, if a new spring were supplied having a spring rate of 1300 lbs. and the springs are arranged to provide a balanced condition at 60 lbs., a deflection of 20/1000 of an inch would require 27.7 lbs. Thus, as a result of the arrangement provided in the present invention, the amount of resistance to movement of the valve 37, and hence the sensitivity of the valve and the amount of "feedback" provided against its movement may be very simply varied by the mere substitution of a spring readily accessible. Under these circumstances, an extremely versatile steering valve is provided which may be easily adjusted to provide any desired midpoint, balanced position or any desired amount of "feel-back" or resistance to valve actuation.

The valve, in the structure illustrated, operates to control energization of a power motor piston 60 mounted for reciprocation within a bore 61 in the housing 10. Hydraulic fluid under pressure is directed into the valve spool 37 via conduit 62 and in the valve-neutral condition passes equally to motor conduits 63 and 64 and from thence to low pressure discharge ports 65, 66 respectively which lead to low pressure sump conduit 67 via ports 40a in the washer 40. As shown, the chamber on the left side of the piston 60 in Figure 1 comprises the entire housing area surrounding the worm 15. This area is directly connected to conduit 63. Accordingly, reciprocation of the actuating rod 41 to the left in Figure 1 will cause the valve 37 to move toward the left directing fluid under pressure from conduit 62 to conduit 63 to bias the piston 60 toward the right. Movement of the piston 60 toward the right will, as a result of the link connection 70 cause counterclockwise rotation of the cross shaft 12 through pivotal link connection 70a. Conversely, if the actuating rod 41 is moved toward the right the valve 37 will close off communication between conduit 62 and 63 and open communication between conduits 62 and 64. Conduit 64 leads to the chamber 68 and pressurization of chamber 68 will cause movement of the cross shaft in a clockwise direction as a result of the link 70 and its connection 70a with the cross shaft. The valve lands 37a are notched in the manner shown in Figs. 8 and 9 in my copending application Serial No. 479,590, filed January 3, 1955, to provide a smooth, yet firm, power application.

Figure 2:
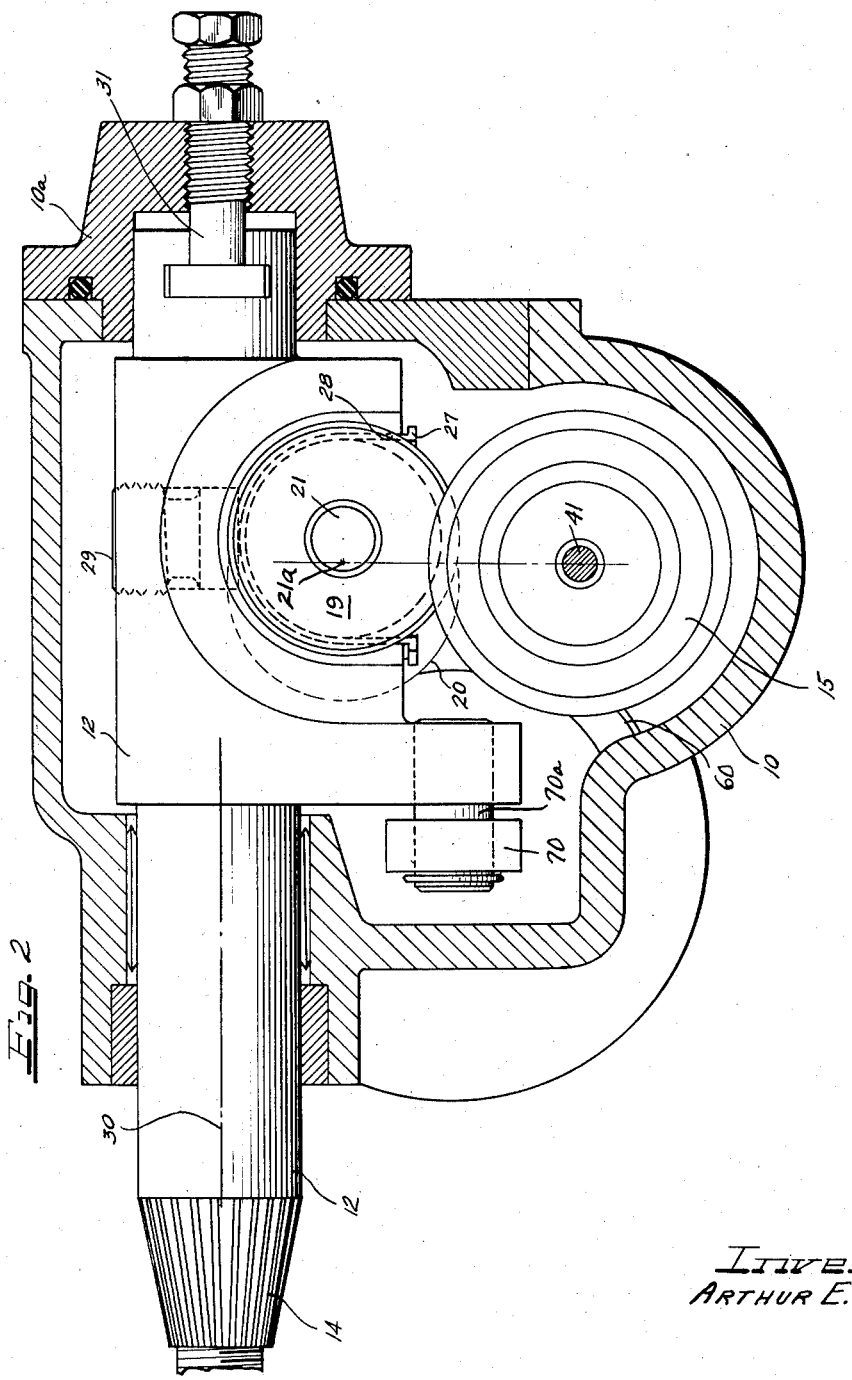
Figure 2 is an end elevational view in cross-section taken along the line II—II of Figure 1.

Actuation of the rod 41 may be accomplished in various manners. In the embodiment of the invention illustrated, however, this actuation is provided without simultaneous reciprocation of either the input shaft 11 or the steering wheel shaft 13. As a result, neither the worm 15 nor the steering shaft need be axially movable with the resultant increase in cost occasioned by such structures. As shown in Figures 2, 3 and 4, the valve rod 41 is carried by plate 47 which is in turn reciprocably movable relative to input shaft 11. The steering wheel shaft 13 is provided with a flange plate 72 axially fixed relative thereto and arranged to rather loosely support the extension spacer 49 on the valve actuating rod 41. As shown in Figure 3, the rod 41 is separated from the plate 72 by means of spaced rubber bushings 73 and 74 which permit movement of the rod 41 throughout its normal, rather small, operating range without interference. The resilient fit provides alignment for the right hand end of the rod 41 even though the axis of rotation of the input shaft 11 and the steering wheel shaft 13 are slightly tilted relative to each other.

As shown, the plate 47 is connected to the casing 44 by means of a plurality of cam links 75 which are pivotally mounted on projecting studs 76 and 77 on the casing 44 and plate 47 respectively. Each of the links 75 is cushioned relative to the respective studs 76 and 77 by means of resilient bushings 78. The plate 47 is positively drivingly connected to the plate 72 by means of a plurality of drive pins 79 which extend from the plate 72 through the plate 47 and through the casing 44 at 80. The aperture 80 in the casing 44 is slightly larger circumferentially than the diameter of the pin 79, thereby providing a lost motion connection between the plates 47, 72 and the casing 44.

As a result of the construction above described, rotation of the steering shaft 13 will cause a positive rotation of the pins 79 and plate 47. If the rotation of the steering shaft 13 is for a right hand turn, the pins 77 will move clockwise. However, as a result of the steering load on the input shaft 11, the casing 44 will lag behind. Accordingly, lost motion at the point 80 will permit movement of the plate 47 rotationally relative to the casing 44 and upon right hand steering movement, the links 75 will pivot in a counterclockwise direction relative to the stud 76. This pivotal movement will require axial movement of the actuating rod 41 to the left opening the valve conduit 62 to the conduit 63 and thereby causing counterclockwise rotation of the cross shaft 12 with resultant right hand steering of the dirigible vehicle wheels. It will be apparent that rotation of the steering wheel shaft 13 in a direction of left hand steering (counterclockwise) will cause a pivoting of the links 75 in a clockwise direction about the pivot studs 76 with a resultant movement of the actuating rod 41 to the right.

As a result of the resiliency of the bushings 73, 74 and the bushings 78 coupled with the pin drive through the pins 79 and the cam links 75, a coupling is provided which has limited universal joint qualities and which provides positive steering drive between the steering shaft 13 and shaft 11 even though moderate misalignments are present. This feature is particularly useful in the modern vehicles in which engine room is becoming more and more cramped. A further important characteristic of the invention as thus described is that it eliminates an inadvertent axial shifting of the steering column from resultant reciprocation of the valve 37. Some earlier systems employing a steering wheel shaft capable of reciprocation for valve actuation were subject to such extremely undesirable inadvertent operation.

It will be apparent, accordingly, that I have provided a novel and substantially improved steering system capable of construction at a very nominal cost. The entire power and manual steering gear may be constructed within a very small total housing or envelope and the exact positioning of the valve as well as the amount of "feel-back" force applied thereto may readily be changed without complex tools. As a result of the application of high rate springs to the valve, very high "feelback" forces may be employed without need for hydraulic "feel-back" and accordingly the cost of the valve is very materially reduced without adversely affecting its operation. The variable ratio steering reduction provided by the construction of the present invention provides extreme stability in the straight-ahead driving condition and very satisfactory force transmission at a sharply decreased steering ratio in conditions of turn. Lastly, the simplified arrangement herein provided, and which limited misalignment between the steering wheel shaft and the steering gear input shaft is permitted, permits utilization of this structure in a wide variety of vehicular constructions without modification of the attachment brackets.

As shown in Figure 1, the core 37 is keyed to rod 41 at key 37a, the small edge dimension of which is there seen, for rotation therewith. By keying the actuating rod 41 to the valve core 37, the valve core 37 is rotated simultaneously with the steering shaft 13 via pins 79 and the clamped attachment between plate 47 and rod 41 at 41a. This rotation of the valve core 37 causes a positive break of the seal provided by the various lands 37a on the valve core 37, thereby eliminating initial hysteresis losses ordinarily found at the valve lands upon cracking or initially opening the valve ports upon reciprocation of the valve core 37.

In the embodiment of the invention illustrated in Figures 1 through 4, above described, it will be recalled that the cam groove 18 of the hour-glass worm 15 is a single continuous groove. Clearly, with this arrangement, rotation of the steering shaft 11 beyond a full revolution will cause one or the other of the rollers 19, 20 to move beyond the axial midpoint of the hourglass worm 15 into a range in the groove 18 in which the steering ratio again begins to increase. If such a reversal of ratio change is not desired, and such change is ordinarily not considered desirable, oscillation of the cross shaft 12 about the axis 30 must be limited to a relatively small angle and the number of turns of the steering shaft must likewise be limited. In order to expand the useful angle of oscillation of the cross shaft 12 while at the same time maintaining complete control of the ratio of movement thereof relative to the hour-glass worm 15, a pair of discontinuous cam grooves 18a and 18b may be provided as shown in Figure 5. As there illustrated, the cross shaft follower rollers 19 and 20 follow cam grooves 18a and 18b respectively. The grooves 18a and 18b do not meet to form a continuous single groove but, instead, overlap in the middle of the hour-glass worm 15a to provide a substantially greater controlled angle of oscillation of the cross shaft 12. The grooves 18a and 18b end, in the embodiment shown, in dead-ends 18c and 18d respectively. As in the case of the cam groove 18 shown in Figure 1, the pitch angle is very small in the straight-ahead or neutral condition of the steering shown in Figure 5, at the point of contact with the rollers 19, 20, and very sharply increases as the groove moves axially toward the middle of the hour-glass cam. After a sharp increase in pitch, with resultant sharp decrease in steering ratio adjacent the straight-ahead steering condition, the groove 18 is constructed to provide a gradually less rapid decrease in ratio.

In the embodiment of the universal joint connection shown specifically in Figures 3 and 4, the axial movement of the valve actuating rod 41 is controlled by mechanical linkage between the steering shaft 13 and the shaft 11. In the modified form of connection shown in Figures 6 and 7, a limited universal joint movement may alternatively be very satisfactorily be provided through a simple bonded connection of rubber or similar resilient material. As shown in Figures 6 and 7, the shaft 13a is provided with a drum or shell 13b having helical surfaces 13c. The shaft 11a is provided with radially outwardly projecting helical surfaces 11b complementing the surfaces 13c. An annular body of rubber or similar resilient material 9 is positioned between the helical members 11b and 13c and operates to transmit rotary force between the members. Obviously, if a torque is applied to the shaft 13a in one direction or the other, the helical nature of the connection 13c—9—11b will cause relative axial movement of shaft 13a relative to shaft 11a. In the embodiment shown in Figures 6 and 7 the shaft 13a is permitted axial movement while the shaft 11a is prevented from axial movement. Axial movement of shaft 13a will cause reciprocation of rod 41b to actuate the valve 37. The rubber bushing 8, and the rubber 9 permit an angular displacement between the axes of the shafts 13a and 11a, thereby providing a slightly universal joint connection without adversely affecting operation of the valve 37.

In the embodiment shown in Figures 6 and 7 the left hand biasing of the actuating rod 41b, similar to the bias supplied by spring 42 in the embodiment of Figures 3 and 4, may be provided by a preload bias condition in the bushing 8, or, alternatively, may be provided by a relatively weak spring 42a. Alternatively, the rubber 9 may be arranged to provide all of the biasing force acting on the valve 37, thereby eliminating both springs 38 and 42a. For example, it has been found that a very high spring rate may be incorporated in the rubber coupling by providing rubber of sufficient hardness and quantity. Where the rubber 9 is substantially 5/32 inch thick, 1 inch long with lands having a 4 inch lead and where the rubber is of durometer 50 hardness, a spring rate of 2000 pounds per inch is achieved. By employing such a coupling the coupling above serves to provide universality, axial movement and resistance to axial movement in an unusually inexpensive manner.

It will be understood that the rubber between the lands 11b and the grooves 13c is necessary for the proper operation of the coupling as described. However, the rubber between adjacent lands may be removed, as shown in Figure 8, thereby reducing rotational resistance in the coupling. As shown, the lands 11b project radially beyond the minimum diameter of the shell 13b. Accordingly, a mechanical connection is provided if the rubber should become damaged in some manner.

It will be obvious to those skilled in the art that variations and modifications may be made in the structure hereinabove illustrated without departing from the scope of the novel concepts thereof. It is, accordingly, my intention that the scope of the present invention be limited solely by that of the hereinafter appended claims.

I claim as my invention:

1. In combination in a power steering gear, a steering input shaft and a second shaft operatively connected to the steered part, a valve movable to control flow of fluid under pressure to a power motor, means moving said valve upon relative lost motion between said shafts to thereby energize the power motor, a high rate spring biasing said valve in one direction, a relatively low rate spring biasing said valve in the opposite direction, said springs being loaded to provide a balanced valve condition in which said valve is in its midpoint neutral position and the springs each remain under some degree of stress throughout the operative range of said valve, and means providing a lost motion connection for permitting said lost motion between said shafts upon the application of steering loads to said second shaft.

2. In combination in a power steering gear, a steering input shaft and an output shaft, a force transmitting connection between said shafts including gear reduction means and a limited lost motion connection, a valve, means reciprocating said valve upon relative lost motion between said shafts to thereby energize a power motor, a high rate spring biasing said valve in one direction, a relatively low rate spring biasing the valve in the opposite direction, means loading said springs to provide a balanced valve condition in which said valve is in its midpoint neutral position and the springs remain under some degree of stress throughout the operative range of reciprocation of said valve, and means for adjusting said high rate spring to vary the loading thereof to thereby vary the neutral position of said valve.

3. In combination in a power steering gear, a steering input shaft and an output shaft, a force transmitting connection between said shafts including gear reduction means and a limited lost motion connection, a valve, means reciprocating said valve upon relative lost motion between said shafts to thereby energize a power motor, a high rate spring biasing said valve in one direction, a relatively low rate spring biasing said valve in the opposite direction, means loading said springs to provide a balanced valve condition in which said valve is in its midpoint neutral position and the springs remain under some degree of stress throughout the operative range of reciprocation of said valve, and means for positively rotating said valve simultaneously with the reciprocation thereof.

4. In combination in a power steering gear, a steering input shaft and an output shaft, a force transmitting connection between said shafts including gear reduction means and a limited lost motion connection, a nonrotatable valve housing having a bore therein in substantial coaxial alignment with one of said shafts, a valve core reciprocably mounted in said housing bore for directing the flow of hydraulic fluid to a power steering motor upon reciprocation of the valve core from a midpoint, neutral, condition, means reciprocating said valve core upon relative lost motion between said shafts to thereby energize said power motor, a high rate spring biasing said valve in one direction, a relatively low rate spring biasing said valve in the opposite direction, means loading said springs to provide a balanced valve condition in which said valve core is in its midpoint neutral position and in which the springs remain under some degree of stress throughout the operative range of said valve core, and means for positively rotating said valve core simultaneously with the reciprocation thereof.

5. In combination in a power steering gear, a steering input shaft and an output shaft, a force transmitting connection betwen said shafts including gear reduction means and a limited lost motion connection, a valve, means reciprocating said valve upon relative lost motion between said shafts to thereby energize a power motor, a high rate spring biasing said valve in one direction, a relatively low rate spring biasing said valve in the opposite direction, means loading said springs to provide a balanced valve condition in which said valve is in its midpoint neutral position and the springs remain under some degree of stress throughout the operative range of reciprocation of said valve, means for adjusting said high rate spring to vary the loading thereof to thereby vary the neutral position of said valve, and a universal joint connected to said input shaft and operatively connected to the output shaft to permit limited misalignment of said input shaft relative to said steering gear.

6. In combination in a power steering gear, a steering input shaft and an output shaft, a force transmitting connection between said shafts including gear reduction means and a limited lost motion connection, a valve, means reciprocating said valve upon relative lost motion between said shafts to thereby energize a power motor, a high rate spring biasing said valve in one direction, a relatively low rate spring biasing said valve in the opposite direction, means loading said springs to provide a balanced valve condition in which said valve is in its midpoint neutral position and the springs remain under some degree of stress throughout the operative range of reciprocation of said valve, means for adjusting said high rate spring to vary the loading thereof to thereby vary the neutral position of said valve, and a universal joint connected to said input shaft and operatively connected to the output shaft to permit limited misalignment of said input shaft relative to said steering gear and incorporating means translating said lost motion into reciprocation of said valve.

7. In combination in a power steering gear, a steering input shaft and an output shaft, a force transmitting connection between said shafts including variable ratio gear reduction means and a limited lost motion connection, said variable ratio gear reduction comprising an hour-glass worm having a roller-engaging cam track therein, said cam track having a variable helical pitch with a high maximum helical pitch at its midpoint and a pitch that decreases rapidly adjacent its ends to a low minimum, said output shaft being rotatably mounted transversely of said worm, a pair of spaced rollers mounted on said output shaft for rotation about an axis transverse to the axis of said output shaft and in simultaneous engagement with said cam track at points of minimum pitch adjacent the opposite ends thereof when said output shaft is in its centered neutral position, motor means applying power to said output shaft upon the occurrence of lost motion during the application of steering loads to said shafts and a valve operable upon said lost motion to energize said motor.

8. In combination in a power steering gear, a steering input shaft and an output shaft, and a force transmitting connection between said shafts including variable ratio gear reduction means, said variable ratio gear reduction comprising an hour-glass worm having a roller engaging cam track therein, said cam track having a maximum helical pitch at its midpoint and a substantially and rapidly decreasing pitch adjacent its ends, said output shaft being rotatably mounted transversely of said worm, a pair of spaced rollers mounted on said output shaft for rotation about an axis transverse to the axis of said output shaft and for simultaneous engagement with said cam track adjacent the ends thereof at points of minimum pitch when said output shaft is in its centered neutral position, motor means for applying power to said output shaft, a reciprocable spool valve, means securing said input shaft and said worm against reciprocation, means providing a lost motion connection in said force transmitting connection between said worm and said input shaft, said last named means including a reciprocating element for reciprocating said valve, and means actuating said element to operate said motor upon the occurrence of lost motion at said lost motion connection during application of steering loads to said shafts.

9. In combination in a power steering gear, a steering input shaft and an output shaft, a force transmitting connection between said shafts including variable ratio gear reduction means, said variable ratio gear reduction comprising an hour-glass worm having a roller engaging cam track therein, said cam track having a maximum helical pitch at its midpoint and a substantially decreasing pitch at its ends, said output shaft being rotatably mounted transversely of said worm, a pair of spaced rollers mounted on said output shaft for rotation about an axis perpendicular to the axis of said output shaft and for simultaneous engagement with said cam track when said output shaft is in its centered neutral position, motor means applying power to said output shaft, a reciprocable spool valve, means securing said input shaft and said worm against reciprocation and means providing a lost motion connection in said force transmitting connection between said worm and said input shaft, said last named means including a reciprocating rod for reciprocating said valve and also including a universal joint connection between said worm and said input shaft whereby said input shaft may be moderately misaligned relative to said worm without effecting operation of said worm or said reciprocating rod, and means actuating said rod to operate said motor upon the occurrence of lost motion at said lost motion connection during the application of steering loads to said shafts.

10. In combination in a power steering gear, a steering input shaft and an output shaft, a force transmitting connection between said shafts including variable ratio gear reduction means, said variable ratio gear reduction comprising an hour-glass worm having a roller engaging cam track therein, said cam track having a maximum helical pitch at its midpoint and a substantially decreasing pitch at its ends, said output shaft being rotatably mounted transversely of said worm, a pair of spaced rollers mounted on said output shaft for rotation about an axis perpendicular to the axis of said output shaft and for simultaneous engagement with said cam track when said output shaft is in its centered neutral position, motor means applying power to said output shaft, a reciprocable spool valve, means securing said input shaft and said worm against reciprocation and means providing a lost motion connection in said force transmitting connection between said worm and said input shaft, said last named means including a reciprocating rod for reciprocating said valve, means for rotating said reciprocating rod upon rotation of said input shaft, means rotating said valve upon rotation of said rod, and means acting to reciprocate said rod upon the occurrence of lost motion at said lost motion connection during the application of steering loads to said shafts.

11. In combination in a power steering gear, a steering input shaft and an output shaft, a force transmitting connection between said shafts including variable ratio gear reduction means and a limited lost motion connection, said variable ratio gear reduction comprising an hour-glass worm having a roller engaging cam track therein, said cam track having a maximum helical pitch at its midpoint and a substantially decreasing pitch at its ends, said output shaft being rotatably mounted transversely of said worm, a pair of spaced rollers mounted on said output shaft for rotation about an axis transverse to the axis of said output shaft and for simultaneous engagement with said cam track when said output shaft is in its centered neutral position, motor means applying power to said output shaft upon the occurrence of lost motion during the application of steering loads to said shafts, and a reciprocable spool valve operable upon said lost motion to energize said motor, said valve comprising a reciprocating valve core mounted substantially coaxially with said worm for reciprocation within a fixed valve housing, and means translating said lost motion into reciprocation of said valve.

12. In combination in a power steering gear, a steering input shaft and an output shaft, a force transmitting connection between said shafts including variable ratio gear reduction means and a limited lost motion connection, said variable ratio gear reduction comprising an hour-glass worm having a roller engaging cam track therein, said cam track having a maximum helical pitch at its midpoint and a substantially decreasing pitch at its ends, said output shaft being rotatably mounted transversely of said worm, a pair of spaced rollers mounted on said output shaft for rotation about an axis perpendicular to the axis of said output shaft and for simultaneous engagement with said cam track when said output shaft is in its centered neutral position, motor means applying power to said output shaft upon the occurrence of lost motion during the application of steering loads to said shafts, and a reciprocable spool valve operable upon said lost motion to energize said motor, said valve comprising a reciprocating valve core mounted substantially coaxially with said worm for reciprocation within a fixed valve housing, means translating said lost motion into reciprocation of said valve, and means providing feel-back against reciprocation of said valve, said last named means comprising a high rate spring biasing said valve in one direction and a low rate spring biasing said valve in the opposite direction, said springs being initially loaded to provide a balanced valve condition in which said valve core is in its midpoint neutral position and in which both of said springs remain under some degree of stress throughout the operative range of reciprocation of said valve core.

13. In combination in a power steering gear, a steering input shaft and a steering gear output shaft, a force transmitting connection between said shafts including variable ratio gear reduction means and a limited lost motion connection, said variable ratio gear reduction comprising an hour-glass worm having a roller engaging cam track therein, said cam track having a maximum helical pitch at its midpoint and a substantially decreasing pitch at its ends, said output shaft being rotatably mounted transversely of said worm, a pair of spaced rollers mounted on said output shaft for rotation about an axis perpendicular to the axis of said output shaft and for simultaneous engagement with said cam track when said output shaft is in its centered neutral position, motor means applying power to said output shaft upon the occurrence of lost motion during the application of steering loads to said shafts, and a reciprocable spool valve operable upon said lost motion to energize said motor, said valve comprising a reciprocating valve core mounted substantially coaxially with said worm for reciprocation within a fixed valve housing, means translating said lost motion into reciprocation of said valve, means providing feel-back against reciprocation of said valve, said last named means comprising a high rate spring biasing said valve in one direction and a low rate spring biasing said valve in the opposite direction, said springs being initially loaded to provide a balanced valve condition in which said valve core is in its midpoint neutral position and in which both of said springs remain under some degree of stress throughout the operative range of reciprocation of said valve core, and means for adjusting said high rate spring to vary loading thereof and to thereby adjust the midposition of said valve core.

14. In combination in a power steering gear, a steering input shaft and a second shaft operatively connected to a steered part, a valve, means reciprocating said valve upon relative lost motion between said shafts to thereby energize a power motor, a high rate spring biasing said valve in one direction, a relatively low rate spring biasing said valve in the opposite direction, said springs being loaded to provide a balanced valve condition in which said valve is in its midpoint neutral position and the springs each remain under some degree of stress throughout the operative range of said valve, and means providing a lost motion connection for permitting said lost motion between said shafts upon the application of steering loads to said second shaft.

15. In combination in a power steering gear, a steering input shaft and an output shaft, variable ratio gear reduction means between said shafts, a limited lost motion connection operatively positioned between said shafts, said variable ratio gear reduction comprising an hour-glass worm having a roller-engaging cam track therein, said cam track having a variable helical pitch with a high maximum helical pitch at its midpoint and a substantially and rapidly decreasing pitch reaching a minimum low pitch adjacent its opposite ends, said output shaft being rotatably mounted transversely of said worm, a pair of spaced rollers mounted on said output shaft for rotation about an axis transverse to the axis of said output shaft and for simultaneous engagement with said cam track at points of low, minimum pitch when said output shaft is in its centered neutral position, motor means applying power to said output shaft upon the occurrence of lost motion during the application of steering loads to said shafts and a valve operable upon said lost motion to energize said motor, said cam track comprising a pair of axially overlapping generally helical variable pitch grooves in said worm.

16. In combination in a universal joint for connecting first and second relatively rotatable steering shafts and actuating a power steering valve upon such relative rotation, a resilient connection between said first and second shafts, said connection comprising resiliently compressible material positioned between rigid members secured for rotation with the respective shafts, said rigid members being positioned at an acute angular relation to the axes of said shafts whereby relative rotation of said shaft compresses said resilient material at an acute angle to said shafts and whereby movement permitted by such compression provides resilient rotary lost motion between said shafts and a resilient axial actuating force for said valve.

17. In combination in a joint for connecting first and second relatively rotatable steering shafts one of which is axially movable and for actuating a power steering valve upon such relative rotation, a limited motion resilient connection between said first and second shafts, said connection comprising resiliently compressible material positioned between rigid members secured for rotation with the respective shafts, said rigid members being positioned at an acute angular relation to the axes of said shafts whereby relative rotation of said shaft compresses said resilient material at an acute angle to said shafts and whereby movement permitted by such compression provides resilient rotary lost motion between said shafts and a resilient axial actuating force for said valve, said rigid members comprising a sleeve secured to the first shaft and extending around a portion of the second shaft, loosely cooperating helical threads on said sleeve and on said portion, said resilient material substantially filling the space between said threads, and means connecting one of said shafts to said valve.

18. In combination in a universal joint for connecting first and second relatively rotatable steering shafts and actuating a power steering valve upon such relative rotation, a limited motion resilient connection between said first and second shafts, said connection comprising resiliently compressible material positioned between rigid members secured for rotation with the respective shafts, said rigid members being positioned at an acute angular relation to the axes of said shafts whereby relative rotation of said shaft compresses said resilient material at an acute angle to said shafts and whereby movement permitted by such compression provides resilient rotary lost motion between said shafts and a resilient axial actuating force for said valve, said rigid members comprising radially extending trunnions on said respective shafts and at least one link member connecting said rigid members and having a force transmitting axis lying at an acute angle to the axes of said shaft, said resilient material comprising a rubber bushing connection between said link and each of said trunnions, and means securing one of said trunnions to said valve.

19. In combination in a steering gear, a steering input shaft and an output shaft, variable ratio gear reduction means between said shafts, said variable ratio gear reduction means comprising an hour-glass worm having a roller-engaging cam track therein, said cam track having a variable helical pitch with a high maximum helical pitch at its midpoint and a pitch that decreases rapidly adjacent its ends to a low minimum, said output shaft being rotatably mounted transversely of said worm, a pair of spaced rollers mounted on said output shaft for rotation about an axis transverse to the axis of said output shaft, said rollers being in simultaneous engagement with said cam track at points of minimum pitch adjacent the opposite ends thereof when said output shaft is in its centered neutral position but in alternate independent positive engagement with said cam track as the output shaft moves away from its centered position.

20. In combination in a steering gear, a steering input shaft and an output shaft, variable ratio gear reduction means between said shafts, said variable ratio gear reduction means comprising an hour-glass worm having a roller engaging cam track therein, said cam track having a variable helical pitch with a high maximum helical pitch at its midpoint and a pitch that decreases rapidly adjacent its ends to a low minimum, said output shaft being rotatably mounted transversely of said worm, a pair of spaced rollers mounted on said output shaft for rotation about an axis transverse to the axis of said output shaft, said rollers being in simultaneous engagement with said cam track at points of minimum pitch adjacent the opposite ends thereof when said output shaft is in its centered neutral position, rotation of said output shaft in either direction away from centered neutral condition causing one of said rollers to disengage said cam track and the steering load to be carried by the other said roller individually.

21. In combination in a steering gear, a steering input shaft and an output shaft, variable ratio gear reduction means between said shafts, said variable ratio gear reduction means comprising an hour-glass worm having a roller-engaging cam track therein, said cam track having a variable helical pitch with a high maximum helical pitch at its midpoint and a pitch that decreases rapidly adjacent its ends to a low minimum, said output shaft being rotatably mounted transversely of said worm, a pair of spaced rollers mounted on said output shaft for rotation about an axis transverse to the axis of said output shaft, said rollers being in simultaneous engagement with said cam track at points of minimum pitch adjacent the opposite ends thereof when said output shaft is in its centered neutral position, one of said rollers engaging said cam track and the other of said rollers disengaging said cam track as said output shaft moves away from centered position to an extreme position, each said roller having at least two annular and relatively angularly disposed surfaces projecting into said cam track at points thereof engaged by the roller as said output shaft moves away from centered neutral position whereby said one roller in engagement with the cam track assumes the steering load as the output shaft moves away from the neutral position.

22. In combination in a joint for connecting first and second relatively rotatable steering shafts and actuating a reciprocating power steering valve upon such relative rotation, a limited lost motion resilient connection between said first and second shafts, said connection comprising resilient material positioned between rigid members secured for rotation with the respective shafts, said rigid members being positioned at an acute angle relation to the axis of their respective shafts whereby relative rotation of said shafts deforms said resilient material at an acute angle to said shafts and movement permitted by such deformation provides resiliently resistant rotary lost motion between said shafts and an axial actuating component of force, and means operatively connected to said resilient material and axially movable by said axial actuating component of force to reciprocate said valve.

23. In combination in a power steering system, a rotatable steering shaft member, a second generally axially aligned rotatable shaft member, means operatively connecting said second shaft member to a steered part, a limited lost motion drive connection between said members, said lost motion connection comprising a resilient coupling formed by a first element rigidly secured to said first shaft member and a second element rigidly secured to said second shaft member, said elements lying at points peripherally spaced, a resilient material connected between said rigid elements whereby relative rotation between said shaft members deforms said resilient material, said elements being positioned at an oblique angle to their respective shaft axes, whereby relative rotation between said shaft members deforms said resilient material in a direction oblique to the said axes, and means movable axially of said shafts in response to deformation of said material to actuate a valve in opposite directions on opposite relative rotation between said shaft members.

24. In a power steering gear, a valve, a pair of rotary coaxial steering member portions, one of which is longitudinally movable and operatively connected to the valve, a valve actuator including an angularly disposed resilient element connecting said generally coaxial portions and adapted to resist relative rotary motion between said two portions and to create motion of said one portion longitudinal to the axes of said shaft portions for shifting the valve upon such relative rotation, similarly angularly disposed rigid elements on the respective shaft portions, said angularly disposed resilient element being secured therebetween whereby said resilient element resists relative rotation of said portions.

25. In combination in a steering gear, a steering input shaft and an output shaft, gear reduction means between said shafts, said gear reduction means comprising an hourglass worm having a roller-engaging cam track therein, said cam track having a helical pitch, said output shaft being rotatably mounted transversely of said worm, a pair of spaced rollers mounted on said output shaft for rotation about an axis transverse to the axis of said output shaft, said rollers being in simultaneous engagement with said cam track at points adjacent the opposite ends thereof when said output shaft is in its centered neutral position but in alternate independent positive engagement with said cam track as the output shaft moves away from centered position.

26. In combination in a steering gear, a steering input shaft and an output shaft, gear reduction means between said shafts, said gear reduction means comprising an hour-glass worm having a roller-engaging cam track therein, said cam track having a helical pitch, said output shaft being rotatably mounted transversely of said worm, a pair of spaced rollers mounted on said output shaft for rotation about an axis transverse to the axis of said output shaft, said rollers being in simultaneous engagement with said cam track at points adjacent the opposite ends thereof when said output shaft is in its centered neutral position, one of said rollers engaging said cam track and the other of said rollers disengaging said cam track as said output shaft moves away from centered neutral position to an extreme position, each said roller having at least two annular and relatively angularly disposed surfaces projecting into said cam track at points thereof engaged by the roller as said output shaft moves away from centered neutral position whereby said one roller in engagement with the cam track is positively retained in the track and individually assumes the steering load as the output shaft moves away from the neutral position.

27. In a power assisted steering gear having a valve, a valve actuator reciprocal to actuate said valve and a steering gear reduction mechanism connected to dirigible vehicle wheels, a combined lost motion valve actuating and centering coupling mechanism comprising a first rotary and axially movable steering member, a second rotary axially fixed member connected to the gear reduction mechanism and generally axially aligned with said first rotary member, at least one resilient member positioned angularly relative to the axis of rotation of said rotary members and radially spaced from the axis of rotation of said rotary members, means rigidly securing the ends of said resilient member to respective rotary members at points peripherally spaced thereon, and means connecting said first rotary member to said actuator for reciprocation thereof, whereby rotation of said first rotary member will deflect said resilient material when a steering load resists rotation of said second rotary member and whereby said deflection resiliently opposes lost motion between said rotary members and creates a reciprocal force operating said valve actuator.

References Cited in the file of this patent

UNITED STATES PATENTS

| | | |
|---|---|---|
| 1,425,765 | Hannum | Aug. 15, 1922 |

FOREIGN PATENTS

| | | |
|---|---|---|
| 535,937 | France | Feb. 2, 1922 |
| 1,135,594 | France | Dec. 17, 1956 |

OTHER REFERENCES

Automotive Industries, page 840, June 13, 1936.